United States Patent
Green

(10) Patent No.: US 8,040,914 B2
(45) Date of Patent: *Oct. 18, 2011

(54) METHOD AND APPARATUS FOR ESTABLISHING METAZONES ACROSS DISSIMILAR NETWORKS

(75) Inventor: Howard Green, Carlsbad, CA (US)

(73) Assignee: Brocade Communication Systems, Inc., San Jose, CA (US)

( * ) Notice: Subject to any disclaimer, the term of this patent is extended or adjusted under 35 U.S.C. 154(b) by 818 days.

This patent is subject to a terminal disclaimer.

(21) Appl. No.: 11/755,111

(22) Filed: May 30, 2007

(65) Prior Publication Data

US 2007/0223502 A1 Sep. 27, 2007

Related U.S. Application Data

(63) Continuation of application No. 10/208,425, filed on Jul. 30, 2002, now Pat. No. 7,583,681.

(51) Int. Cl.
*H04J 3/16* (2006.01)
(52) U.S. Cl. .......... 370/466; 370/401; 370/389; 370/392
(58) Field of Classification Search .................. None
See application file for complete search history.

(56) References Cited

U.S. PATENT DOCUMENTS

| | | | | |
|---|---|---|---|---|
| 6,683,883 B1* | 1/2004 | Czeiger et al. | ............. | 370/401 |
| 6,718,392 B1* | 4/2004 | Krause | ................. | 709/238 |
| 6,769,021 B1* | 7/2004 | Bradley | ............... | 709/220 |
| 6,961,332 B1* | 11/2005 | Li et al. | ............... | 370/352 |
| 7,499,468 B2* | 3/2009 | Montgomery, Jr. | .......... | 370/453 |
| 2003/0093567 A1* | 5/2003 | Lolayekar et al. | ............ | 709/246 |
| 2003/0093627 A1* | 5/2003 | Neal et al. | ............. | 711/153 |
| 2003/0097661 A1* | 5/2003 | Li et al. | ............. | 725/109 |
| 2003/0135642 A1* | 7/2003 | Benedetto et al. | ............ | 709/238 |
| 2007/0112931 A1* | 5/2007 | Kuik et al. | ............. | 709/216 |

* cited by examiner

*Primary Examiner* — Duc C Ho
(74) *Attorney, Agent, or Firm* — Conley Rose, P.C.

(57) ABSTRACT

A system and method for creating and enforcing meta-zones that cross the interface between different network protocols are disclosed. In one embodiment, a method of enforcing meta-zones comprises: (a) receiving an Infiniband (IB) packet destined for a Fibre Channel (FC) target device; (b) comparing a partition key in the IB packet to a partition key associated with the FC target device; and (c) converting the IB packet to a FC frame only if the partition keys match. The method may further comprise receiving FC frames destined for an IB target device and converting the FC frame into an IB packet having a partition key associated with the source of the FC frame. Also disclosed are a gateway configured to create and enforce meta-zones, and computer networks having such a gateway.

16 Claims, 5 Drawing Sheets

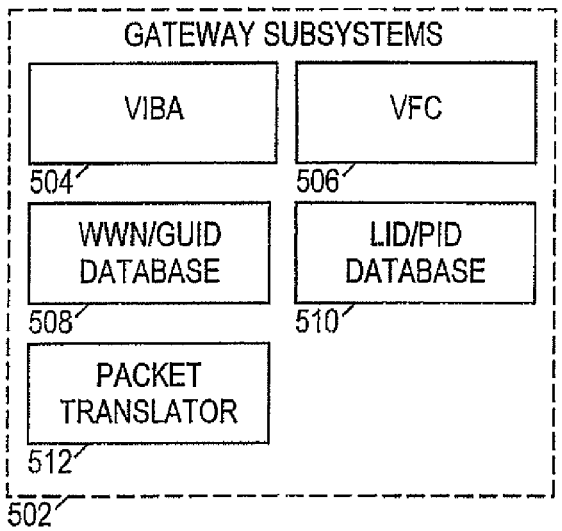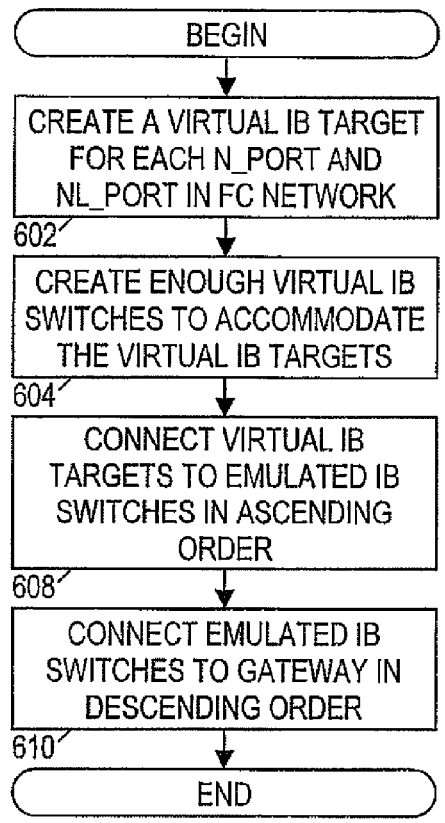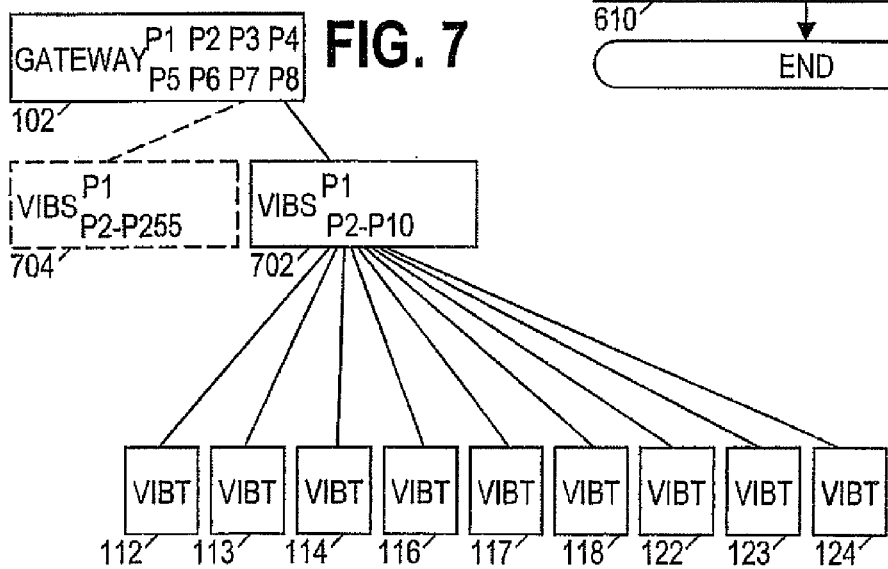

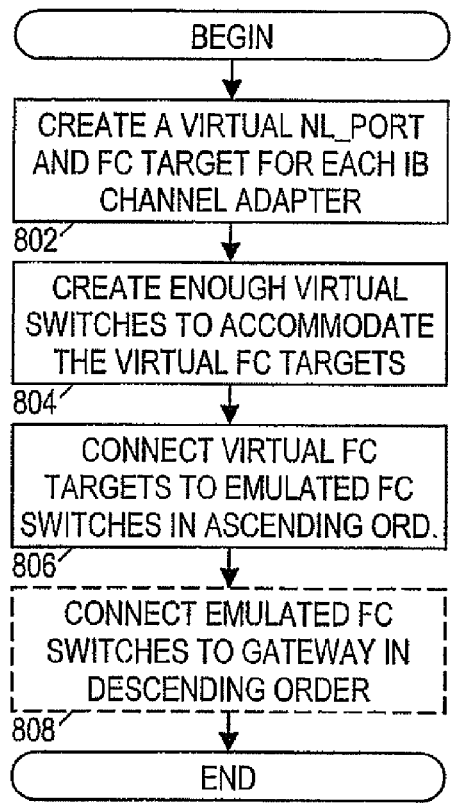
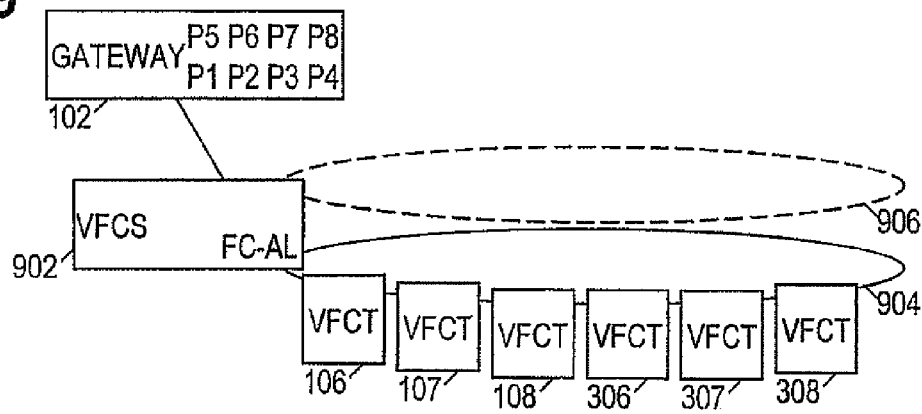

METHOD AND APPARATUS FOR ESTABLISHING METAZONES ACROSS DISSIMILAR NETWORKS

CROSS-REFERENCE TO RELATED APPLICATIONS

The present application is a continuation of, and thus claims priority to, Ser. No. 10/208,425, filed Jul. 30, 2002 by Howard Green, and entitled, "Method and Apparatus for Establishing Metazones Across Dissimilar Networks," incorporated herein by reference.

BACKGROUND

1. Field of the Invention

This invention generally relates to systems and methods for implementing storage area networks. More specifically, this invention relates to a method and apparatus that allows establishment of metazones across dissimilar networks such as Infiniband networks and Fibre Channel networks.

2. Description of Related Art

Internetworking of high-performance computers has become the focus of much attention in the data communications industry. Performance improvements in processors and peripherals, along with the move to distributed architectures such as client/server configurations, have spawned increasingly data-intensive and high-speed networking applications, such as medical imaging, multimedia, and scientific visualization. Various protocols have been developed to provide the necessary communications capacity.

A protocol known as Fibre Channel can carry data at rates exceeding 2 Gbps in both directions simultaneously. The Fibre Channel protocol defines standard media and signaling conventions for transporting data in a serial fashion. It also provides an error correcting channel code and a frame structure for transporting the data. Further, the Fibre Channel protocol sets out a buffer-credit-based flow control methodology, and creates some common services (e.g., fabric controller, directory server). The Fibre Channel protocol can be applied to various network topologies including point-to-point, ring, and switched fabric. Details regarding the Fibre Channel protocol can be found online at www.fibrechannel.org.

Another, newer, protocol known as Infiniband can carry data at rates exceeding 2.5 Gbps in each direction. The Infiniband architecture is designed around a point-to-point, switched I/O fabric, that connects end node devices. Much like the Fibre Channel protocol, the Infiniband protocol defines standard media and signaling conventions for transporting data in a serial fashion, provides error detection codes and a packet structure for transporting the data, and creates some standard services (e.g., subnet manager, subnet administrator). Details regarding the Infiniband protocol can be found online at www.infinibandta.org.

While Infiniband possesses similarities to Fibre Channel (e.g., both rely on structured serial communications, both provide standardized fabric management services, both support higher-level protocols such as SCSI (Small Computer Systems Interface), IP (Internet Protocol), and VDI (Virtual Device Interface), there are nevertheless many differences including different signaling protocols and different services. Both protocols may be employed to implement system area networks, and hence there exists a need for intercommunication between networks that use different protocols. For example, many customers would prefer to expand their existing networks with the latest technology and not have to start from scratch. Other customers just need low-latency communication between dissimilar networks. A method for integrating a Fibre Channel network into an Infiniband network is therefore highly desirable.

SUMMARY OF THE INVENTION

Accordingly, there is disclosed herein a system and method for providing creating and enforcing meta-zones that cross the interface between dissimilar networks such as an Infiniband (IB) network and a Fibre Channel (FC) network. In a preferred embodiment, a method of enforcing meta-zones comprises: (a) receiving an IB packet destined for a FC target device; (b) comparing a partition key in the IB packet to a partition key associated with the FC target device; and (c) converting the IB packet to a FC frame only if the partition keys match. The method may further comprise receiving FC frames destined for an IB target device and converting the FC frame into an IB packet having a partition key associated with the source of the FC frame.

A preferred method of creating meta-zones in such an environment comprises: (a) identifying groups of target devices, with at least one group including both a FC and an IB target device; (b) propagating group-identifying information to a FC zoning service; and (c) propagating group-identifying information to an IB subnet manager. The method may further comprise creating virtual IB targets for FC target devices in groups that include an IB target device, and creating virtual FC targets for IB target devices in groups that include a FC target device.

The present invention may further contemplate a gateway configured to create and enforce meta-zones, and computer networks having such a gateway. The disclosed systems and methods may advantageously provide a secure, protocol-transparent zoning configuration that crosses the interface between IB and FC networks or other networks that provide for partitioning of end node devices.

BRIEF DESCRIPTION OF THE DRAWINGS

Various aspects of the invention will become apparent upon reading the following detailed description and upon reference to the accompanying drawings in which:

FIG. 5 shows logical subsystems of a gateway;

FIG. 6 shows a method of mapping a FC network to a virtual IB network;

FIG. 7 shows a specific example of a virtual IB network;

FIG. 8 shows a method of mapping an IB network into a virtual FC network;

FIG. 9 shows a specific example of a virtual FC network; and

Figure 1:
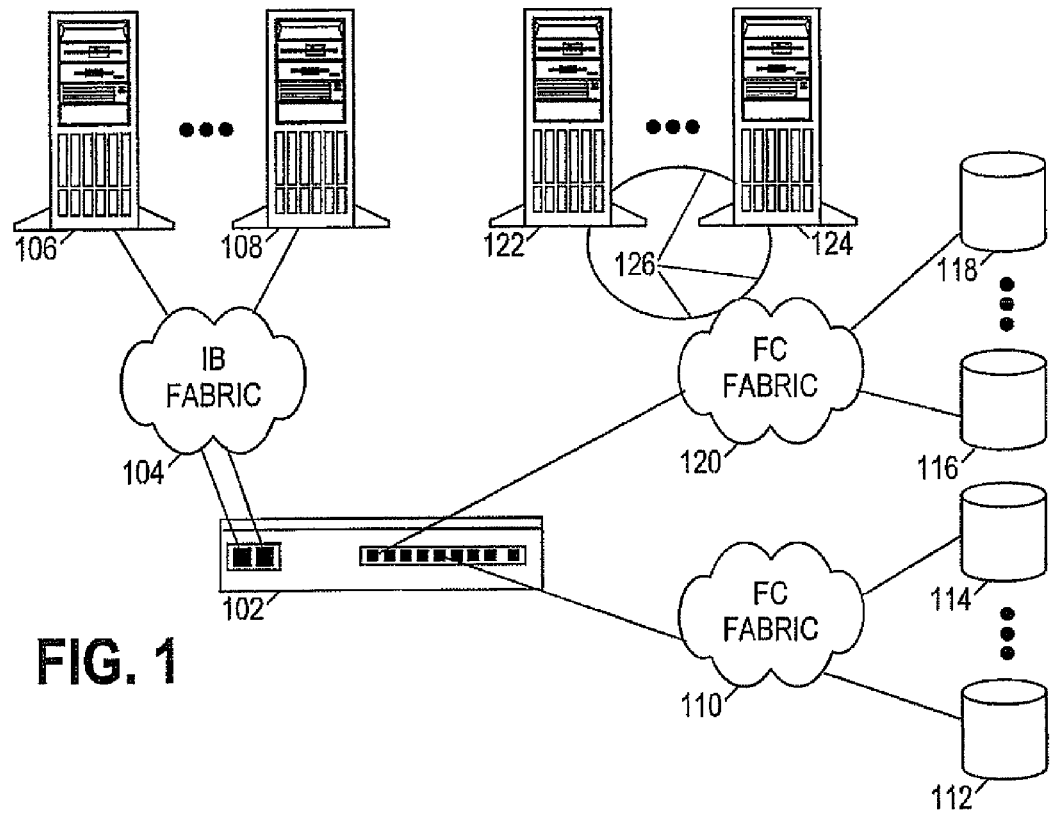
FIG. 1 shows a gateway coupled between an Infiniband (IB) and a Fibre Channel (FC) network.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF PREFERRED EMBODIMENTS

Interfacing IB and FC Networks

A gateway is a device that allows communication between networks that use different communications protocols. An edge router is a gateway that also provides router functionality to one or more of the networks. The following description concerns a gateway that is preferably also an edge router. The gateway preferably couples between Infiniband and Fibre Channel networks, and it preferably makes all target devices in each network "visible" to the other network(s). That is, Fibre Channel N_Ports (ports on end node devices) preferably appear to devices in the Infiniband network as remote Infiniband ports that are accessible using global addressing. Conversely, the Infiniband channel adapters preferably appear to devices in the Fibre Channel network as N_ports that are accessible using N_Port identifiers. The gateway itself preferably complies with management protocols of both Infiniband and Fibre Channel networks, presenting itself as a switch or router to the Infiniband network, and presenting itself as one or more E_Ports (expansion ports) to the Fibre Channel network.

Turning now to the figures, FIG. 1 shows a gateway 102 in a illustrative configuration that couples an Infiniband (IB) network to two Fibre Channel (FC) networks. The IB network includes a "fabric" 104 that connects processor nodes 106, 108 (storage nodes may be similarly connected) to gateway 102. The term "fabric" denotes an arbitrary arrangement of interconnected network elements that transport packets (or frames) of information between any attached nodes. The FC networks also include fabrics. One of the FC networks includes a fabric 110 that couples storage nodes 112, 114 together, and the other FC network includes a fabric 120 to couple storage nodes 116, 118 and processor nodes 122, 124. The processor nodes 116, 118 are shown coupled to the fabric 120 via an arbitrated loop 126.

Figure 2:
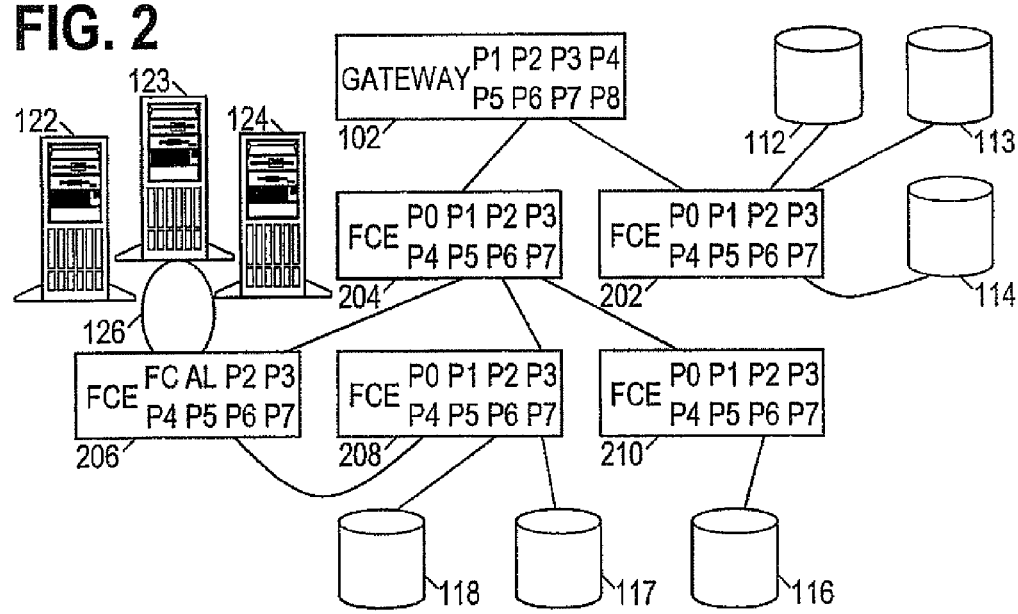
FIG. 2 shows a specific example of a FC network.

An example of the two FC networks is shown in FIG. 2. The first FC fabric 110 takes the form of a FC element (FCE) such as a switch 202. A FC link connects, say, port 7 of the gateway 102 to port 0 of switch 202. Storage devices 112-114 are coupled by respective FC links to respective ports of switch 202. Switch 202 directs frames received via any of the links to an appropriate outgoing link based on the destination address of the frame. Hence, the nodes 112-114 can communicate with each other and can send and receive frames through the gateway 102.

Figure 3:
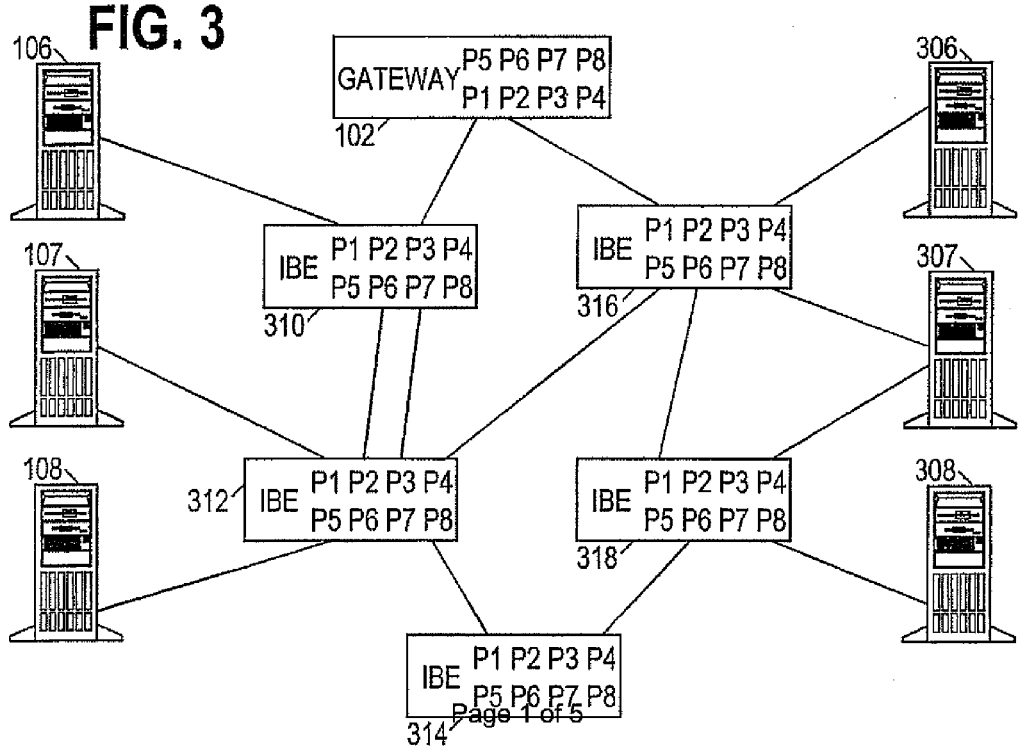
FIG. 3 shows a specific example of an IB network.

The second FC fabric takes the form of four interconnected switches 204-210. The switch network couples the storage nodes 116-118 to the processor nodes 122-124 and to the gateway 102, and transports information frames between them all. Similarly, the IB fabric 104 (as shown in FIG. 3) takes the form of five interconnected switches 310-318 that couple to processor nodes 106-108, 306-308. IB links couple (say) ports 1 and 2 of the gateway to switches 310 and 316, respectively.

Talkthrough

The gateway 102, through the use of virtual targets, may advantageously make the barrier between different network protocols "transparent". An IB device can "talk" through the gateway to a FC device without regard to (and indeed, without being aware of) the fact that the FC device operates on the FC protocol. A FC device is able to talk to IB devices in the same manner. Further details of the manner in which the gateway provides transparent communication are provided in conjunction with the following discussion of the preferred gateway embodiment.

Preferred Gateway Embodiment

Figure 4:
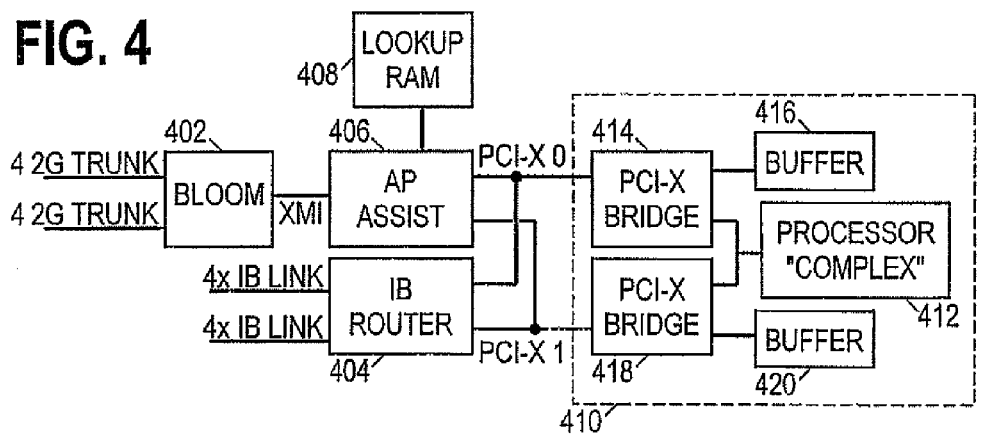
FIG. 4 shows an example of a functional block diagram for a gateway.

FIG. 4 shows a functional block diagram of a preferred embodiment of gateway 102. It includes a router ASIC, hereafter termed the "Bloom" 402, that attaches to FC links. The Bloom 402 preferably supports up to eight FC links (shown in FIG. 4 as two trunks, each carrying four 2 Gb/s FC links). The Bloom 402 couples the FC links together in the manner of a normal router (i.e., sending and receiving frames with different source and destination identifiers), and it also couples the FC links to an adjunct processor (AP) assist chip 406. The Bloom 402 provides the AP 406 with any frames directed to the gateway itself (i.e., network management packets) or frames directed to devices in the IB network. The Bloom 402 also accepts frames from the AP 406 and routes them to the appropriate destination in the FC network.

The gateway 102 also includes an IB router ASIC 404 that attaches to IB links. The IB router 404 preferably supports up to two 4x IB links. The IB router 404 couples the IB links together in the manner of a normal router, but also couples the IB links to the AP 406. The IB router provides the AP 406 with any packets directed to devices in the FC network or directed to the gateway itself and it accepts packets from the AP 406 and routes them to the appropriate destination in the IB network.

The AP 406 is a protocol conversion engine, i.e., it provides protocol conversion between IB and FC, which includes translating FC frames to IB packets and vice versa. Further, the AP 406 preferably translates the frame/packet addressing information as specified further below, before directing non-management frames to the Bloom 402 or non-management packets to router 404. Further, the AP 406 preferably implements FC administrative services and IB management agents as needed to carry out the management roles of a router and devices from the networks in the appropriate fashion.

For example, initiation and termination of connections in an IB network is performed by communication managers (CM) in the end nodes. When the gateway 102 makes a FC device "visible" to the IB network, it does so by creating a virtual IB version (hereafter, a virtual IB target) of that FC device. An IB device attempting to connect to the FC device will contact the CM of the corresponding virtual IB target. The AP 406 preferably emulates the CM of the virtual IB target to enable the connection. Once the CM of the virtual IB target receives a connection request, it requests a Queue Pair (QP) allocation for the connection. The CM then forwards the allocated QP information to the initiating IB host as part of connection establishment handshakes. Once the initiating IB host receives the reply, it completes the connection by sending a ready response. For connections initiated from the IB side, the CM preferably follows the Passive State Transition Table. Further details are available in section 12.9.6 "Communication Establishment—Passive" in Volume 1 of the Infiniband Specification v1.0.

AP 406 preferably takes the form of a field programmable gate array (FPGA), which is preferably provided with a fast memory 408 for speed-matching buffers. These buffers are used for buffering data being moved between the IB and FC networks. The chips of gateway 102 are shown in FIG. 4 as connected by an extended memory interconnect (XMI) bus and by two extended peripheral component interconnect (PCI-X) buses. However, other buses may be used, and indeed, the various circuits may be integrated into a single chip.

Each of the routers 402, 404 maintains a table of destination addresses and the corresponding "direction" in which to send frames or packets having the specified destination addresses. The routers may also determine local addresses of the specified destination from specified global addresses, and add those to the packet or frame as appropriate. The AP 406 also maintains database tables to translate between addresses in the different network protocols. (The tables for AP 406 are stored in lookup RAM 408.) These tables may preferably be constructed by control module 410 in accordance with the protocols of the attached networks.

Control module 410 preferably includes a processor "complex" 412, i.e., one or more processors coupled to the AP 406 and the IB router 404. In the embodiment of FIG. 4, the processor complex 412 is coupled to the AP 406 and the router 404 by two PCI-X bridges 414, 418. The bridges are provided with corresponding buffers 416, 420 to prevent congestion of the PCI-X buses. The processor complex 412 preferably includes long term storage for software (or firmware) for the processor to execute. The software configures operation of the processor complex, causing it to initiate and coordinate the operation of the Bloom 402, the router 404, and the AP 406. The software may include procedures for configuring the AP 406 if it is in FPGA form. (Note that communication between the processor complex 412 and Bloom 402 may occur indirectly through AP 406 or over support buses not shown in FIG. 4.)

The software executing in control module 410 preferably models the gateway 102 as an IB router that is connected to IB fabric through real IB ports and that is connected to FC fabric through logical IB ports. To facilitate IB access to the FC network, the software creates a logical view of the FC fabric for IB Managers by configuring the AP 406 to simulate IB fabric elements. These simulated elements take the place of the FC fabric elements to create a seamless logical view of the IB network. This subsystem of the AP 406 is herein termed the Virtual Infiniband Agent (VIBA) subsystem 504 (see FIG. 5), and it is preferably implemented as a database utility.

VIBA 504 supports management datagram (MAD) queries, both direct-routed and LID (local identifier) routed. MADs are packets used for IB fabric management. A master subnet manager (SM) somewhere in the IB network is responsible for discovering the network topology, configuring each port with identifiers and partition keys, configuring each switch with a local identifier (LID) and forwarding database, and for serving as a directory. The VIBA 504 intercepts MAD queries directed to simulated IB fabric elements, and responds to those queries as the simulated elements would. Configuration information for the simulated elements is added to the database of simulated elements.

VIBA data access may be divided into two general categories: IB or FC access. An applications program interface (API) for IB access preferably exposes functions that the gateway's Common Agent Interface uses to interact with VIBA. The IB access API mainly deals with IB-related calls such as get/set (i.e., calls that get or set IB device parameters), but does not provide ability to add or create virtual elements. An FC access API exposes functions that an FC daemon on the gateway uses to create and maintain the VIBA database. It provides ability to create, add, and delete virtual elements so that VIBA can be properly manipulated when the daemon receives events from FC fabric. It also provides ability to internally retrieve and update virtual elements based on IB queries and sets.

The VIBA database is preferably organized as a tree structure, i.e., an internal data organization structure based on a flat VIBA topology. Virtual FC switches and end nodes are built in tree format based on the FC to IB port mapping method (described further below). This structure is created to facilitate traversing of virtual elements using direct routed addressing. For example, when traversing for port1-port4 direct routed addressing, software can simply follow the 'void *port [1]', and 'void *port[4]' to arrive at the desired switch or end node. The VIBA database preferably also includes a hash table, i.e, an internal data organization structure based on hashing of local identifiers (LID). The hash table contains entries that each point to a virtual FC switch or end node. This structure is created to facilitate LID routed addressing.

VIBA's main objective is to facilitate IB host access to FC devices. However, a certain level of mapping of IB hosts to FC space is also required to allow the gateway 102 to facilitate inter-network communications initiated by FC devices. Accordingly, the software also configures the AP 406 to simulate PC fabric elements that replace the IB fabric to create a seamless logical view of the FC network. This subsystem of the AP 406 is herein termed the Virtual Fibre Channel (VFC) subsystem 506, which may also be implemented in a similar fashion to the VIBA database utility.

FIG. 5 shows some of the AP subsystems 502. The subsystems include the VIBA subsystem, the VFC subsystem, a worldwide name (WWN) to globally-unique identifier (GUID) database 508, a local identifier (LID) to port identifier (PID) database 510, and a packet translator subsystem 512. The WWN/GUID mapping database 508 relates the WWN of simulated FC devices to the GUID of IB devices that the simulated FC devices represent, and relates the GUIDs of simulated IB devices to the WWNs of actual FC devices that they represent. Similarly, the LID/PID database 510 relates the PID of simulated FC N_ports to the LID of the actual IB device ports that they represent, and relates the LIDs of simulated IB ports to PIDs of actual FC N_ports that they represent.

Thus, for example, frames received by AP 406 from the FC network will have source identification (S_ID) and destination identification (D_ID) fields containing PIDs of an actual FC source node and a simulated FC destination node. For frames traveling to the IB network, the packet translator subsystem 512 uses the LID/PID database to translate the source PID into the LID of the corresponding (simulated) IB host port, and to translate the destination PID into the LID of the corresponding (actual) IB host port. Similar conversion occurs for packets traveling in the opposite direction. The WWN and GUID fields are similarly treated.

Returning to VIBA subsystem 504, the IB simulations of the FC network are preferably created and connected using a Minimum Emulation Model. This model essentially virtualizes FC end nodes (i.e., N_Ports and NL_Ports) individually, and virtualizes the FC switch fabric as a whole. While the Virtual IB Targets (VIBT) have a one-to-one relationship to unique FC end nodes, virtual IB switches generally do not have a one-to-one relationship to unique FC switches. Virtual IB switches are preferably created based on the number of virtual targets, and are used to provide connection points for the virtual targets in a flat topology regardless of the underlying FC fabric topology.

FC to IB Mapping

FIG. 6 shows a preferred method of creating an IB model for an FC network. In block 602, the AP creates a VIBT for each N_Port and NL_Port detected in the FC network. The VIBT preferably includes a virtual target channel adapter (TCA), a virtual input/output controller (IOC), and preferably a virtual input/output (IO) device, as this allows for distinct emulation of the administrative functions of each component.

Alternatively, of course, a unitary virtual IB target may be created with support for the whole set of administrative functions.

In block 604, the AP creates just enough virtual IB switches to support the virtual IB targets. Each IB switch can have up to 256 ports, including port 0 which is reserved for the switch processor, and including port 1 which connects the switch to the gateway. Since IB only allows for one-to-one connection of end nodes, each IB switch can have up to 254 end nodes. Accordingly, VIBA must comply with a hard limitation of 254 virtual IB targets per virtual IB switch (VIBS). To determine the number of VIBS's, the AP 406 divides the number of VIBT's by 254, and rounds any non-integer value up to the next integer, thus performing the mathematical function ceil(N/254).

In block 608, the AP establishes switch port connections for each VIBS. The VIBT are preferably connected to the virtual IB switch ports in ascending order, starting with switch port 2, and progressing to higher port numbers. Then in block 610, the AP preferably connects the VIBS to the gateway ports in descending order, starting with the highest-numbered gateway port and progressing lower.

FIG. 7 illustrates the virtual IB network that results from the application of the FIG. 6 method to the FC network shown in FIG. 2. Virtual IB targets that replace FC devices 112-118, 122-124 are coupled to VIBS 702, which in turn is coupled to port 8 of the gateway. If more than one switch were needed, the second VIBS 704 would be coupled to port 7 of the gateway.

Note that the virtual port assignments are preferably semi-permanent. In other words, if a FC device leaves the network and later returns, it preferably is re-connected in its previous virtual location.

This then is the logical topology of router 102 and the attached FC fabric as it is presented to IB managers. VIBA may be implemented as a constantly updating database of FC elements in IB format. The VIBA may be separated into two components: a database and a FC event daemon. The FC event daemon preferably initializes the VIBA database and updates the content based on events generated by the FC fabric. Such events may include RSCN (Registered State Change Notification), SCN (State Change Notification), etc. The VIBA database would contain an IB mapping of FC elements according to the FC mapping algorithm discussed earlier. The database is preferably optimized for both direct routed and LID routed MAD queries. For example, it may have a tree structure that is also tied to a LID-based hash table. Thus, the elements can easily be queried either by direct routed based addressing or LID based addressing.

The VIBA firer maintains the configuration and state information for the virtual elements in the database so that it can emulate the various IB-specified agents for those elements. For example, the IB specification 1.0 Volume 1 requires that IB switch elements each implement a Subnet Management Agent (SMA) and two General Service Agents (GSA); namely, a Performance Management Agent (PMA), and a Baseboard Management Agent (BMA). Other general service agents, such as the Device Management Agent (DMA), Communication Manager (CM), SNMP Tunneling, Vendor Specific Agents, and Application Specific Agent, are optional for switch elements. The VIBA preferably supports fall emulation of SMA, PMA, and BMA per each Emulated IB Switch. For virtual IB targets, the VIBA preferably implements a SMA, a PMA, a BMA, a DMA and a CM per Name Server (NS) entry in the FC fabric.

To implement these agents, the VIBA intercepts MAD queries from the IB network that are directed to the virtual IB elements, processes (and updates) the state information stored in the database, and transmits the appropriate MAD responses.

IB to FC Mapping

Turning now to FIG. 8, the virtualization of the IB network is described. A mapping of the IB network to a simulated FC network is desirable to support correct FC network routing of response packets from FC targets to IB initiators and to allow FC device inquiry about IB devices through the FC Name Server (NS). The method shown in FIG. 8 is similar to the FIG. 6 method, in that IB devices are individually virtualized and the IB fabric is treated as a whole.

Beginning with block 802, the VFC subsystem of the AP creates a virtual NL_Port and FC target for each IB channel adapter in the IB network. Then in block 804, the AP creates enough virtual switches to accommodate the virtual FC targets.

The maximum number of available ports (neglecting any connection to the gateway 102) in a FC switch is 256. Each of those ports may be an arbitrated loop port (FL_Port), which can be connected to as many as 127 other devices. Accordingly, each virtual FC switch (again, neglecting any connection to gateway 102) can support up to 256*127=32,512 virtual FC targets. It may be desirable to allow for a connection to the gateway 102, either by treating the gateway as a loop port or by treating the gateway as a link port. In the first case, the switch can support up to 32,511 virtual targets. In the second case, the switch can support up to 32,385 virtual FC targets. However, in the preferred embodiment, no allowance is made for a connection to the gateway. Accordingly, in step 804, the number of virtual switches is determined by dividing the number of virtual FC targets by 32,512 and rounding any non-integer value up to the next integer, thus performing the mathematical function ceil(N/32,512).

In block 806 the virtual FC targets are coupled to the virtual FC switches in ascending order of switch port and loop position, starting with switch port 1, loop position 1, and filling the loop before progressing to the next higher switch port. If desired, the virtual switches can be coupled to the gateway ports in descending order, as illustrated by optional block 808. This is expected to be unnecessary for FC routing. The AP preferably routes the packets received from the FC network using LID/PID translation instead of port or DID translation.

FIG. 9 shows the virtual FC network that results from applying the method of FIG. 8 to the IB network of FIG. 3. The virtual network includes a virtual FC switch 902 coupled to an arbitrated loop 904. The virtual FC targets 106-108, 306-308 are on the arbitrated loop. If more than 127 virtual FC targets existed, an additional arbitrated loop 906 could be provided as shown.

In order to support IB device communications to a FC device, the response packets from the FC device need to be routed properly to the gateway using current FSPF (Fabric Shortest Path First) routing protocol. FSPF is based on the domain identification number (DID) of FC switches, and the FC standard allows only 239 such numbers. Accordingly, the number of virtual FC switches is minimized so as to minimally affect the FC network.

FC devices may inquire about IB devices through the FC name server. Accordingly, IB device information is gathered by the VFC subsystem, converted to FC conventions, and added to the name server in the FC fabric. In networks where the FC devices are not initiating inter-network communications (e.g., storage devices), this process may be limited to just those IB devices that initiate such communications. In those circumstances, the VFC subsystem gathers the name server information only when the IB device initiates communication using Communication Manager MADs. This may advantageously allow the port identifiers (PID) to be assigned based on availability of unused PIDs for the virtual switch DIDs allocated by VFC subsystem. If no more PIDs are available, then a new DID is allocated by VFC to provide additional PIDs.

Addressing Virtual Elements

Addressing within IB and FC are similar in that both networks have permanent and temporary addresses. In FC, the permanent address is WWN. In IB, it is GUID. In FC, the temporary address is PID. In IB, it is LID. However, similarity ends there and there is no easy algorithm for address conversion. Therefore mapping databases 508, 510 are used to allocate and keep track of IB-FC addressing pairs.

In order to support management packet routing and data protocol conversion, mapping of LID-to/from-PID and GUID-to/from-WWN information is stored in utility databases. These databases are updated when Subnet Manager (SM) does LID assignments, or when the gateway 102 assigns Virtual WWN or Virtual GUID). The databases are also optimized to provide easy indexing using either protocol addressing.

When Virtual IB Targets and Emulated IB Switches are created, they are assigned Virtual GUIDs. The IB standard defines GUID as a 64-bit wide unique address in IB name space. Unfortunately, there isn't a very good way to convert real WWNs to Virtual GUIDs. Accordingly, the VIBA subsystem assigns "permanent" virtual GUIDs based on the following preferred template (other templates are possible):

bits 63:40—vendor-specific number issued by IEEE
bits 39:32—product-specific number determined by vendor
bits 31:16—device-specific number (e.g., serial no.)
bits 15:0—assigned by VIBA The vendor-specific number is a unique 24-bit number assigned by the IEEE to companies desiring such a number. The product specific number is an 8-bit number that the company assigns to a given product line. So, for example, a company might assign its line of 8-port FC-to-IB gateways a product number of (say) 0xFF. The device-specific number is a 16-bit number that is unique to each device within the product line. The lowest 16 bits of the virtual GUID are assigned by the VIBA so as to give each virtual IB target and switch a unique GUID. Note that these numbers are preferably assigned on a "permanent" basis, and are preferably recycled only after an extended period of time has lapsed without usage of that number.

IB LIDs for all IB devices (including virtual IB targets) are assigned by the service manager of the IB network during the normal course of network operations. The VIBA adds the LIDs of the virtual IB targets to the LID/PID database as they are received from the service manager.

When Virtual FC Targets and switches are created, they are assigned virtual WWNs. The FC standard defines WWN as a 64-bit wide unique address in FC name space. Again, unfortunately, there isn't a very good way to convert real GUIDs to Virtual WWNs. Thus, the VFC subsystem assigns "permanent" Virtual WWNs to based on the following preferred template (other templates are possible):

bits 63:60—address class
bits 59:36—vendor-specific number issued by IEEE
bits 35:32—product-specific number determined by vendor
bits 31:16—device-specific number (e.g., serial no.)
bits 15:0—assigned by VFC The address class is used to distinguish between device types, e.g., class 1 indicates FC switches, while class 2 indicates FC ports. Virtual WWNs preferably use a class 5 identifier to avoid address conflict with real FC devices. The vendor-specific number is the same as described previously, as is the device-specific number. The product-specific number here is a 4-bit number that the company assigns to a given product line. As before, the lowest 16 bits of the virtual WWN are assigned by the VFC subsystem to give each virtual FC target and switch a unique WWN. These 16-bit numbers are preferably assigned on a "permanent" basis, and are preferably recycled only after an extended period of time has lapsed without usage of that number.

The VFC subsystem assigns PIDs to Virtual FC Targets based on the assigned DID of the Emulated FC Switch. Since all virtual FC targets are given (semi-)permanent locations, the VFC subsystem can determine the port number and arbitrated loop position number portions of the PIDs.

Zoning and Partitioning

Gateway 102, in making the IB network appear as an FC network and the FC network appear as an IB network, preferably preserves the zoning feature of the FC network and the partitioning feature of the IB network. Zoning and partitioning are conceptually similar. A partition is a set of IB channel adapters that are allowed to communicate with each other. Insofar as possible, a given channel adapter is unaware of any other channel adapters except the ones sharing membership in its partition. It is possible for channel adapters to be members of multiple partitions. Similarly, FC N_ports are isolated from any N_Ports not in the same zone, and N_Ports can be members of multiple zones. The differences lie in the implementation. IB partition implementation relies on the use of partition keys that are embedded in each packet to designate the partition membership of that packet. FC zone implementation relies on the use of zone membership lists maintained in the switches. VIBA is not easily able to correlate zoning configuration, which already exists, with the partition keys. Hence, integrating these two features to be managed as one at peer-to-peer level presents some challenges.

In the preferred embodiment, the gateway enforces IB specific partitions and (at least at the hardware level) neglects the FC zoning configurations. The Bloom 402 is preferably configured to ignore zone membership lists for FC frames provided to AP 406, so the FC zoning configuration will have no effect on FC frames that reach the gateway en route to the IB network. The VIBA subsystem 504 obtains and stores partition key information for its virtual IB devices in response to the IB network's SM partition key assignments, and the AP 406 inserts the appropriate partition keys in the IB packets provided to the IB router 404. The IB router 404 enforces the IB-specific partitions independent of FC zoning configurations. For example, a certain amount of partition checking is required for connections to be established. As part of connection request, the partition key to be used is forwarded. The Communication Manager for a virtual IB target will check to see if the partition key is allowed for the device. If no match, the connection request is rejected. If matched, connection handshake moves forward.

The FC zoning configuration, however, is not entirely ignored. Rather, it is translated into the IB domain and managed from there. In order to manage zoning from IB, each individual FC zone is translated into a partition key (P_Key) to be stored in VIBA subsystem 504 and "pushed" to the IB SM via a vendor-defined interface to the SM partition management function. The partition keys are later used by AP 406 and IB router 404 to enforce partitioning throughout the subnet. In this manner, zoning and partitioning can be managed at a peer-to-peer level to create a single subnet view of FC/IB zoning.

Meta-zoning

Figure 10:
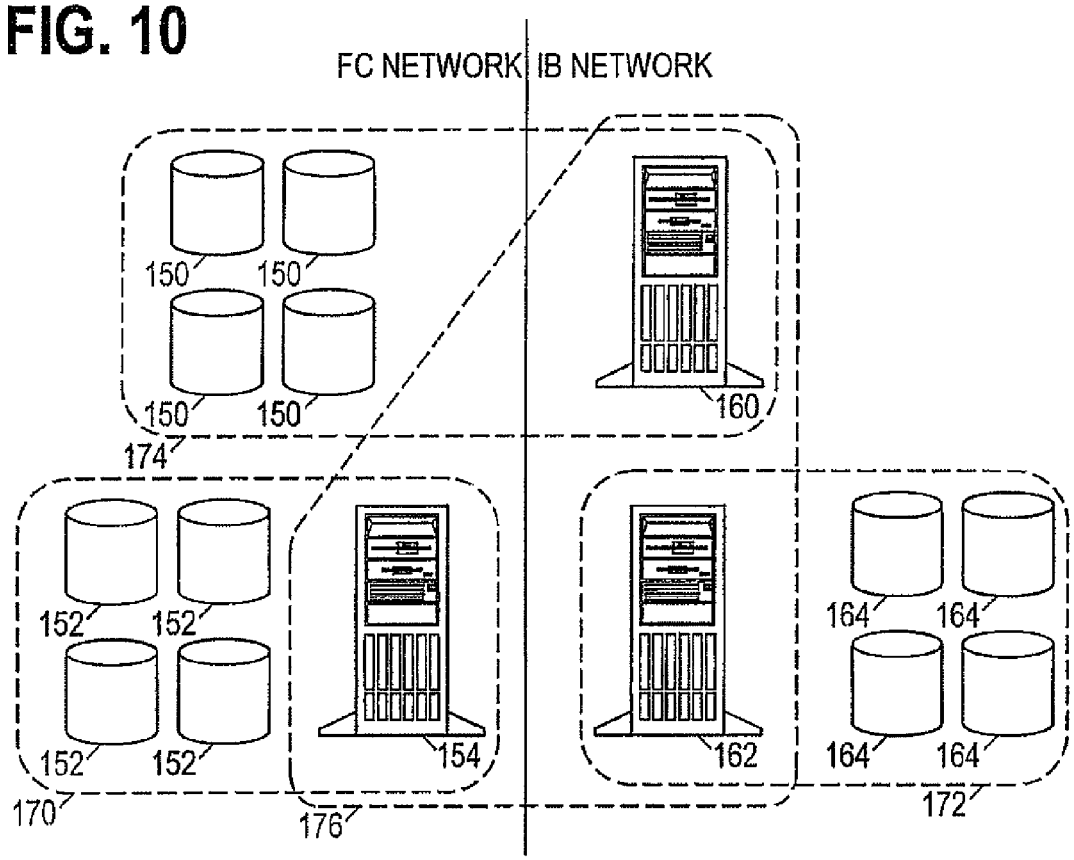
FIG. 10 shows an example of meta-zoning in an IB/FC network.

In the preferred embodiment, the gateway preferably provides ways, such as CLI (command line interface), API (application program interface), etc, to create IB-FC meta-zoning where a user specifies groups of IB and FC devices that should have access to one another. Referring to FIG. 10, for example, a user may wish to specify four meta-zones 170-176. Meta-zone 170, which is a FC zone, includes FC devices 152 and 154. Meta-zone 172, which is an IB partition, includes IB devices 162 and 164. Meta-zone 174, which is a cross-protocol zone/partition, includes devices 150 and 160. Meta-zone 176, which overlaps other meta-zones and is a cross-protocol zone/partition, includes devices 154, 160, 162. When meta-zones are enabled, a given device can only communicate with other devices that are members of a meta-zone that includes the given device.

The gateway may then automatically propagate the meta-zoning configuration to FC zoning service and the IB subnet manager (SM). The creation of meta-zoning can be facilitated by the gateway providing a list of IB devices retrieved through Subnet Administration and a list of FC devices retrieved through Name Server. Accordingly, device discovery and virtual mapping is preferably done before any zoning takes place.

For greater efficiency, virtual addresses may be assigned to the identified devices after the meta-zoning has been configured. The list of FC targets to be virtualized can then be calculated based on zoning configuration. If any active or passive zoning configurations contain a virtual WWN of an IB host, all WWN or PID of the FC devices listed in the same zone are assigned Virtual GUID and virtualized by IBAV. If the zoning is disabled or zoning configurations do not contain any Virtual WWN, no devices are virtualized. The virtual WWNs of the IB devices to be mapped are used in setting up the FC zone configuration. IB partition configuration may proceed afterward.

Although zone enforcement and the creation of meta-zones is discussed above in terms of a gateway between FC and IB networks, it should be recognized that the above approaches to zone enforcement and creation of meta-zones can also be applied by gateways between other network protocols, including without limitation, Ethernet, SCSI (Small Computer Systems Interface), iSCSI (Internet SCSI), and TCP/IP networks. Although it is preferred that both protocols have support for zoning (or some similar concept), it is not strictly necessary.

Numerous variations and modifications will become apparent to those skilled in the art once the above disclosure is fully appreciated. It is intended that the following claims be interpreted to embrace all such variations and modifications.

What is claimed is:

1. An apparatus, comprising:
a gateway configured to enforce a communication group configuration using a first protocol communication element and a second protocol communication element, wherein the communication group configuration includes at least one communication group having at least one first protocol target device and at least one second protocol target device as members, the first protocol different from the second protocol, wherein the gateway is configured to emulate at least one first protocol communication administrator for the at least one second protocol target device.

2. The apparatus of claim 1, wherein the at least one communication group excludes at least another second protocol target device.

3. The apparatus of claim 1, wherein the gateway is configured to associate the first protocol communication element with the at least one second protocol target device.

4. The apparatus of claim 1, wherein the gateway is configured to compare a first protocol communication element in at least one first protocol packet to the first protocol communication element associated with the at least one second protocol target device and convert the at least one first protocol packet into a second protocol packet if the communication elements match.

5. The apparatus of claim 1, wherein the gateway is configured to insert the second protocol communication element into at least one first protocol packet.

6. The apparatus of claim 1, wherein the gateway is configured to generate a first protocol communication element for a communication group that includes only second protocol target devices, and wherein the gateway is configured to provide the first protocol communication element to a first protocol communication administrator.

7. The apparatus of claim 1, wherein the gateway is configured to provide at least one virtual first protocol target associated with the at least one second protocol target device.

8. The apparatus of claim 1, wherein the gateway is configured to provide at least one virtual second protocol target associated with the at least one first protocol target device.

9. An apparatus, comprising:
at least one first protocol port;
at least one second protocol port, the second protocol different from the first protocol; and
a protocol conversion engine coupled between the at least one first protocol port and the at least one second protocol port,
wherein the protocol conversion engine is configured to associate a first protocol communication element with at least one second protocol target device configured to be coupled to the at least one second protocol port;
wherein the protocol conversion engine is configured to associate a second protocol communication element with at least one first protocol target device configured to be coupled to the at least one first protocol port, wherein the protocol conversion engine is configured to emulate at least one first protocol communication administrator for at least one virtual first protocol target associated with the at least one second protocol target device.

10. The apparatus of claim 9, wherein the protocol conversion engine is configured to convert at least one second protocol packet from the at least one second protocol target devices into a first protocol packet that includes the first protocol communication element.

11. The apparatus of claim 9, wherein the protocol conversion engine is configured to provide at least one virtual first protocol target for only the at least one second protocol target device in communication groups that include first protocol target devices.

12. The apparatus of claim 9, wherein the protocol conversion engine is configured to provide at least one virtual second protocol target for only at least one first protocol target device in communication groups that include second protocol target devices.

13. A method, comprising:
comparing a first protocol zoning element of a first protocol packet to a second protocol zoning element associated with a second protocol target device, the second protocol different from the first protocol;
emulating a first protocol administrator for the second port target device; and converting the first protocol packet to a second protocol packet only if the zoning elements match.

14. The method of claim 13, further comprising:

converting another second protocol packet into another first protocol packet, wherein the converting includes inserting another first protocol zoning element associated with a source of the another second protocol packet.

15. The method of claim 14, wherein the another second protocol packet is addressed to a virtual second protocol target associated with a first protocol target device.

16. The method of claim 13, wherein the first protocol packet is addressed to a virtual first protocol target associated with the second protocol target device.

* * * * *